(12) United States Patent
McLaughlin et al.

(10) Patent No.: US 6,231,264 B1
(45) Date of Patent: May 15, 2001

(54) TORQUE ROD BEARING ASSEMBLY

(75) Inventors: Ronald J. McLaughlin, Maumee; Kevin Jaworski, Norwalk, both of OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 09/190,477

(22) Filed: Nov. 12, 1998

(51) Int. Cl.$^7$ .................................................. F16C 11/08
(52) U.S. Cl. ........................... 403/76; 403/135; 384/210; 180/352
(58) Field of Search ............................. 403/76, 122, 135, 403/140, 132, 133, 56; 180/352; 384/206, 209, 210

(56) References Cited

U.S. PATENT DOCUMENTS

| | | | |
|---|---|---|---|
| 3,342,513 | * | 9/1967 | Melton et al. .................... 403/135 X |
| 3,411,803 | * | 11/1968 | Melton et al. .................... 403/119 X |
| 3,501,184 | | 3/1970 | Van Winsen et al. . |
| 4,034,996 | * | 7/1977 | Manita et al. .................... 403/140 X |
| 4,098,527 | | 7/1978 | Herbert et al. . |
| 4,129,394 | | 12/1978 | Eichinger et al. . |
| 4,747,810 | * | 5/1988 | Shepley et al. ................... 384/206 X |
| 4,880,329 | * | 11/1989 | Sakai ................................ 403/134 |
| 4,883,263 | * | 11/1989 | Buhl ............................... 403/133 X |
| 5,028,163 | * | 7/1991 | Krieg et al. ..................... 403/131 |
| 5,230,580 | * | 7/1993 | Henkel ............................ 403/135 |
| 5,407,288 | | 4/1995 | Watanabe . |
| 5,564,521 | | 10/1996 | McLaughlin et al. . |
| 5,795,092 | * | 8/1998 | Jaworski et al. ................. 403/133 X |
| 5,931,597 | * | 8/1999 | Urbach ............................ 403/134 |

\* cited by examiner

*Primary Examiner*—Harry C. Kim
(74) *Attorney, Agent, or Firm*—Harness, Dickey & Pierce, PLC

(57) ABSTRACT

A V-configuration torque rod has an apex pivotal joint assembly which includes either a single forging or a pair of eyelets each of which form one arm of the V. An intermediate sleeve is located within the forging or each eyelet and an elastomeric bearing socket is located within the sleeve. The bearing socket defines a pocket within which a bar-pin journal is located. Each eyelet of the apex pivotal joint assembly is connected to a tube which is connected to an end pivotal joint assembly. Each end pivotal joint assembly has an internal joint configuration the same as the apex pivotal joint assembly.

31 Claims, 6 Drawing Sheets

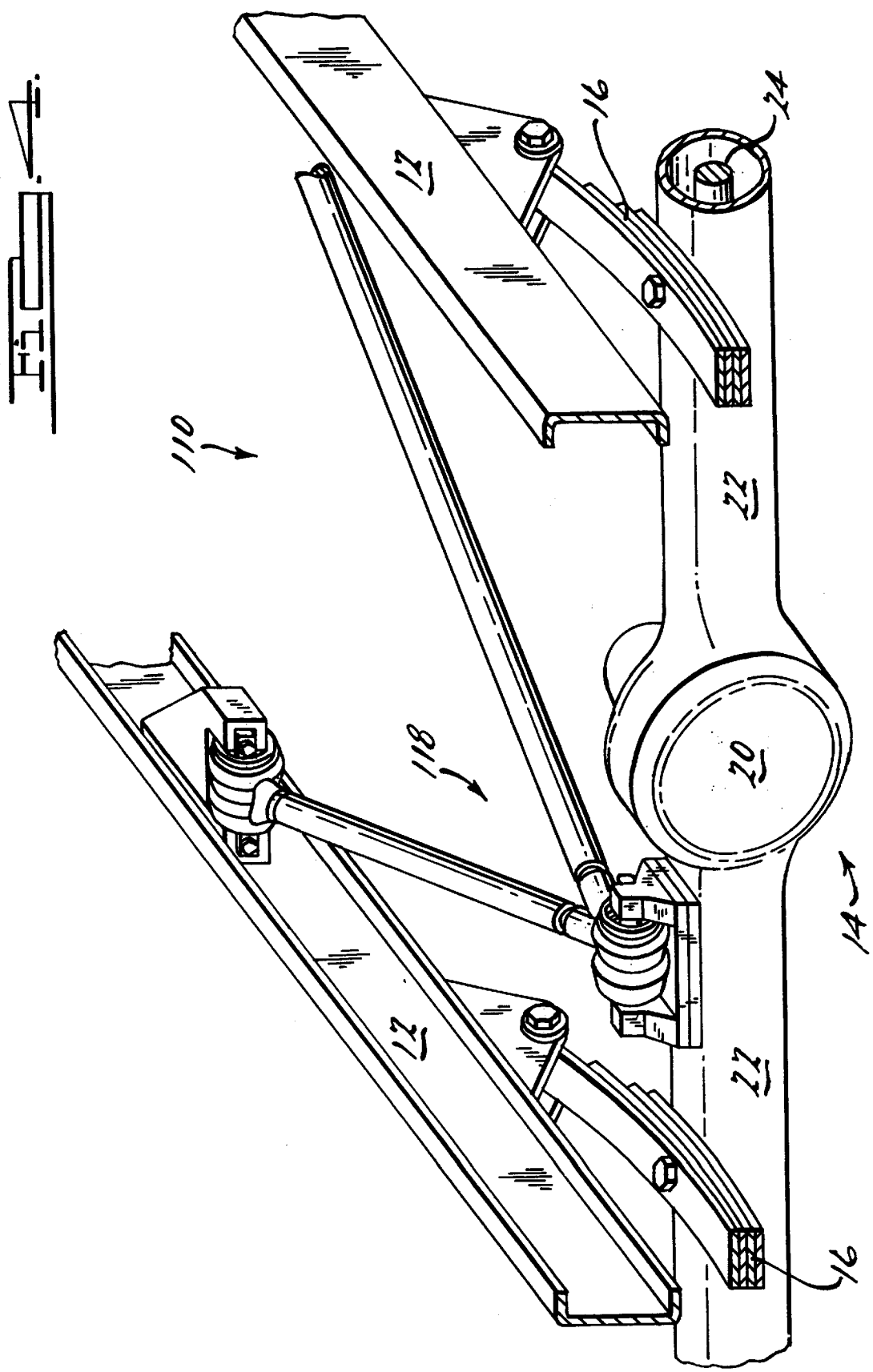

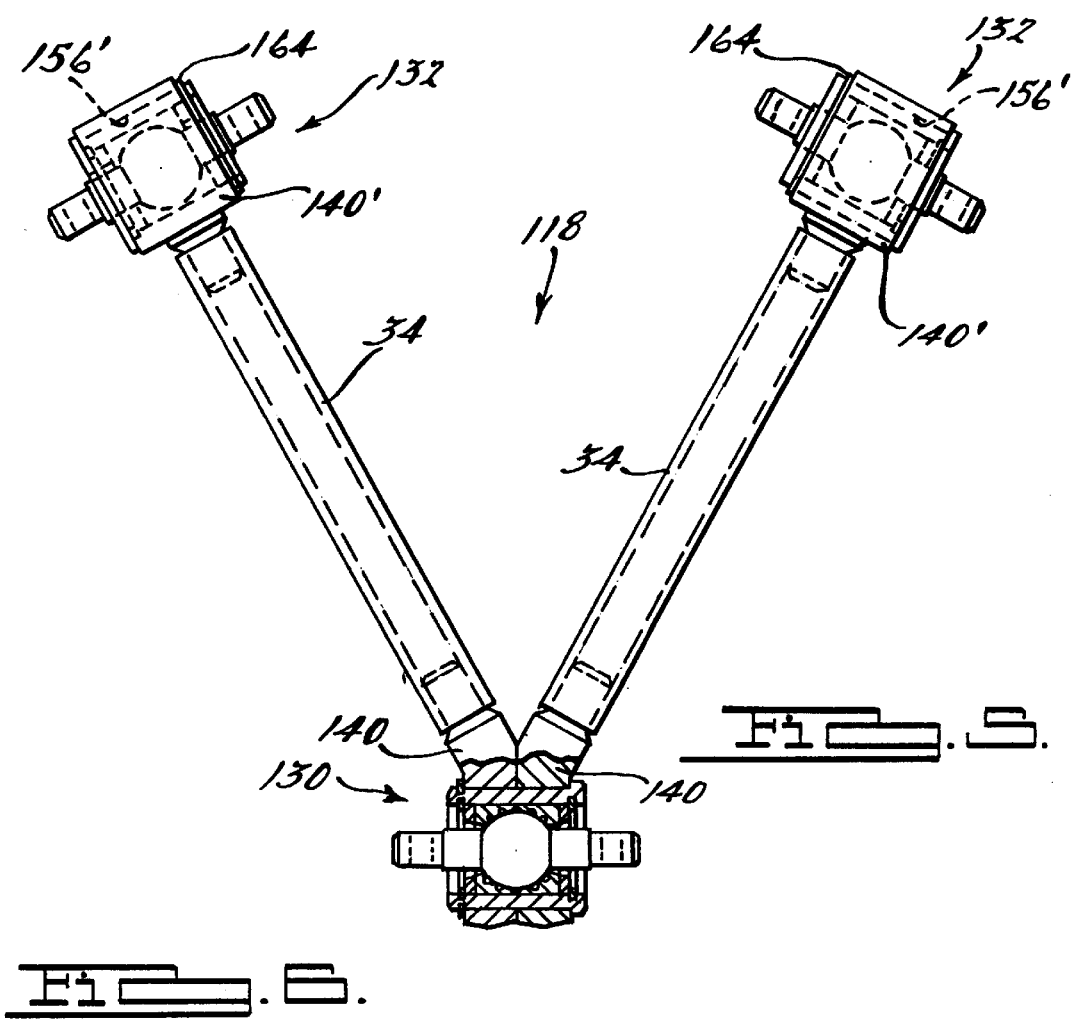
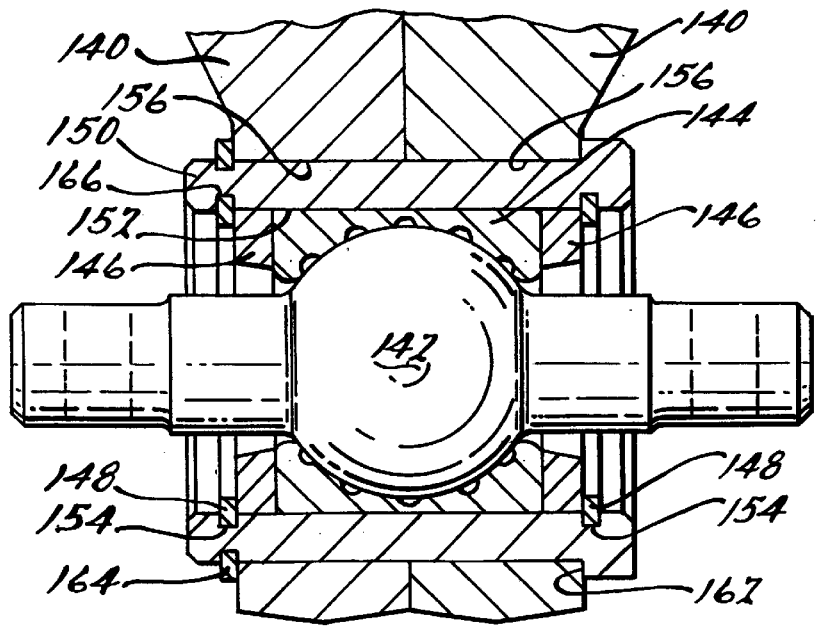

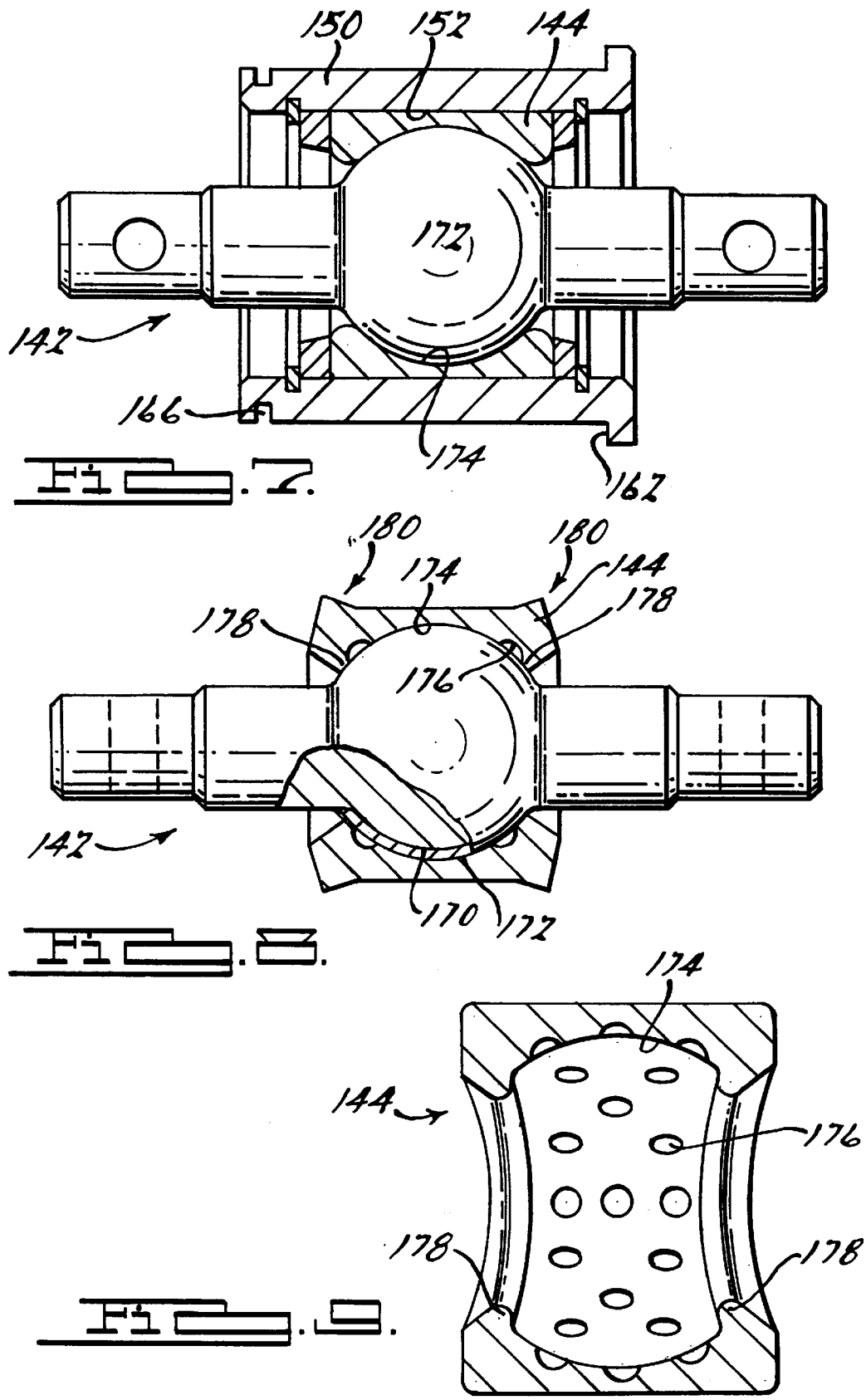

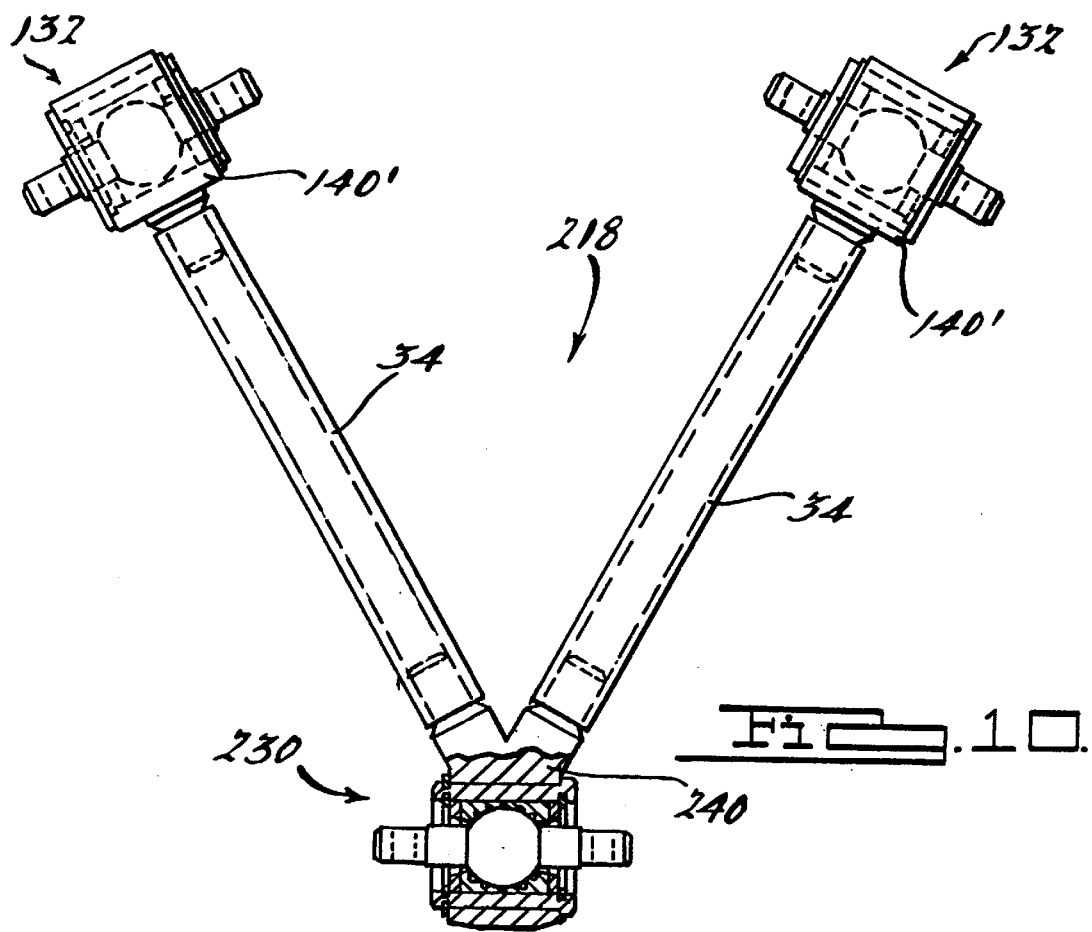
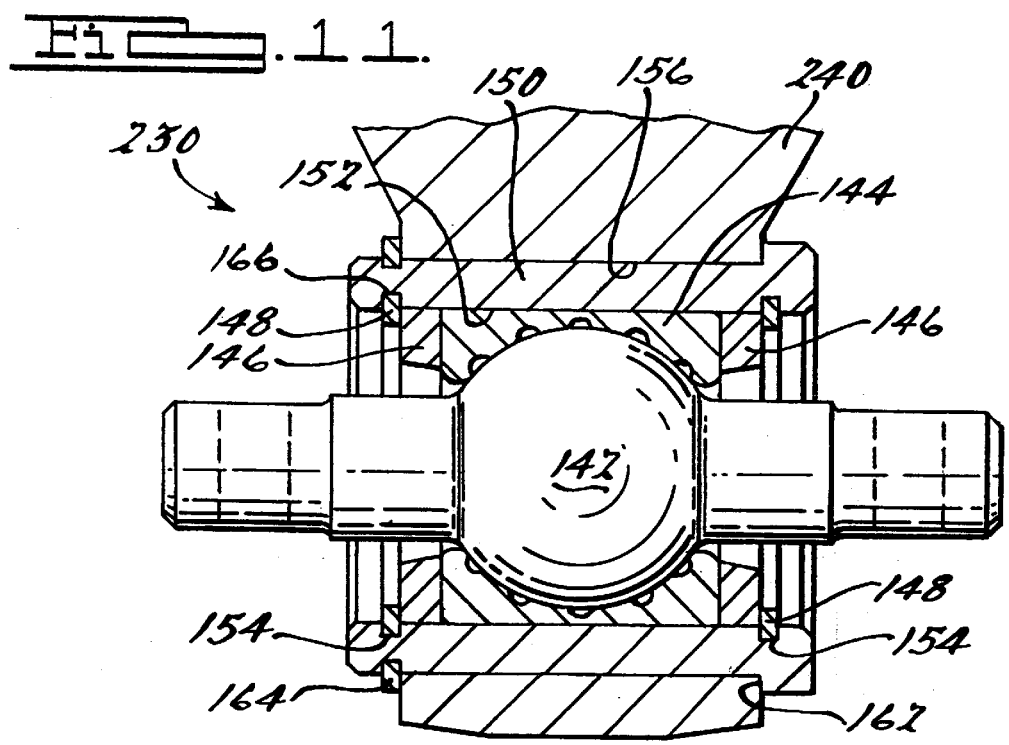

TORQUE ROD BEARING ASSEMBLY

FIELD OF THE INVENTION

The present invention is related to torque rod assemblies for use in suspension systems for trucks, buses and the like. More particularly, the present invention is related to an improved pivotal joint for the torque rod assemblies.

BACKGROUND OF THE INVENTION

Truck and bus suspensions utilize at least one torque rod to secure the drive axle to the vehicle's frame. The securing of the drive axle to the vehicle's frame by the torque rod maintains the drive axle's alignment to the vehicle's frame, it maintains the proper suspension geometry for the vehicle, and it allows free suspension movements in jounce and rebound for all terrain, road and driving conditions. Because of the wide range of dynamic operating conditions for these vehicles, especially heavy duty trucks, the severe impact loads to the suspension system combined with the road induced vibrations on the suspension system lead to a deleterious effect on the individual suspension components including the torque rods as well as having a negative impact on the operator's physical fatigue condition. These severe dynamic conditions can accelerate wear of the torque rods of the suspension system leading to premature failures of these torque rods.

The purpose of torque rods on large vehicles is to stabilize the axle. They prevent the axle from rotating about its axis; they prevent the axle for moving fore and aft during braking and acceleration; and they prevent axle yaw. While there are a variety of suspension designs, two approaches are generally used to stabilize the axle. The first approach uses straight rods with pivotal joints at either end. Two of these straight rods are mounted fore and aft o the vehicle; where one end is mounted to the axle and the other end is mounted to the frame. A third straight rod is similarly mounted laterally in the vehicle, generally perpendicular to he other two. The second approach is a V-configuration torque rod assembly. This type of torque rod has pivotal joints at the apex of the V as well as at the ends of the legs. The apex is mounted to the axle, and the legs are mounted to the frame. The V-configuration controls both fore-aft movement as well as lateral movement. The major advantage of the V-configuration rod assembly is axle stability.

A typical prior art single or V-configuration rod is comprised of two or three pivotal joint eyelet forgings rigidly connected with tubes or rods to provide the mechanical integrity. The eyelets and tubes or rods form a natural path for shock and vibration energy to transfer from the suspension system into the frame, the cab and other areas of the sprung mass of the vehicle. In order to intercept this path, attempts have been made to incorporate an isolation function into the pivotal joint design. This isolation function thus makes the pivotal joint a critical multi-functional component for the torque rod assembly as well as the suspension system as a whole.

Current pivotal joint designs are based on at least two product principles. The first is that the designs incorporate flexible elastomeric bushings and the second is that the designs incorporate metal on metal or metal/plastic components. Both of these designs have their individual advantages but because of their performance capability limitations, neither one encompasses the needed combination of noise, vibration and harshness (NVH) isolation capability; torsional or oscillatory freedom; and lateral spring rate control. Each of these three characteristics are essential elements for the optimum isolation while maintaining the necessary vehicle handling and stability. All three characteristics have a significant impact on NVH and handling properties thus leading to a significant affect on the operator's physical condition. The pivotal joint designs that incorporate a flexible elastomeric bushing are known for their good isolation capability but their inherent flexibility may compromise the stability that can be provided by a rigid joint at he apex of a V-configuration rod. In addition, the limited torsional oscillatory angle capability of the flexible elastomeric bushing and the inherent zero point of the torsional spring complicates the installation of torque rods having this type of pivotal joint. The pivotal joint designs that incorporate rigid metal or metal/plastic ball joint pivots are based on the sliding bearing product principle. Although the sliding bearing principle provides suspension freedom in the vertical plane and requires a relatively simple installation process, the bearing's rigidity limits its isolation capability. Consequently, it acts as a conduit for road induced impact and vibrations into the frame and eventually into the cab. Other disadvantages of the rigid metal or metal/plastic designs is that they consist of numerous costly semi precision bearing components requiring expensive boot seals that are vulnerable to wear, tear, exterior cuts and the like. In addition, the sliding bearing designs require periodic maintenance and lubrication.

In the V-configuration (three pivot joint designs), the most critical component is the apex pivotal joint which is normally positioned on the drive axle. This apex pivotal joint design is critical because it is subjected to double the load of the individual arm or frame connection pivots; it is subjected to greater conical displacement than the frame connection pivots; it is the closest to the source of road induced impacts, tire noise and vibration in general; and its fore and aft and lateral mode spring rate ratio affects the pivotal joint's isolation effectiveness and vehicle stability.

In addition to the two or three pivotal joints incorporated into the various designs for torque rods, pivotal joints can be incorporated into other suspension components. This can lead to as many as twelve or more pivotal joints being incorporated into a single suspension system, thus amplifying the influence that the design of the pivotal joint has on the NVH and handling properties of the vehicle.

The continued development of pivotal joints for suspension components has been directed towards designing pivotal joints which are able to maximize their isolation capabilities while simultaneously maximizing the stability provided by the pivotal joint.

SUMMARY OF THE INVENTION

The present invention provides the art with a pivotal joint that provides an improved performance along with a high load carrying capability. The pivotal joint of the present invention is more economical and more effective at isolating vibrations. The compact pivotal joint of the present invention is based on a sliding bearing principle providing free suspension vertical motion and axle articulation. The pivotal joint comprises two basic components including a double shank bar-pin journal and a permanently lubricated and sealed for life elastomeric bearing socket.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 4 is a partial perspective view of a typical truck or bus rear suspension having a V-configuration torque rod incorporating the unique pivotal joint in accordance with the present invention;

FIG. 5 is a plan view, partially in cross-section illustrating a unique V-configuration torque rod in accordance with the present invention;

FIG. 6 is an enlarged plan view, partially in cross-section of the apex pivotal joint of the torque rod shown in FIGS. 4 and 5;

FIG. 7 is a side view, partially in cross-section, of the sliding elastomeric isolator bearing pivot assembly shown in FIGS. 4–6;

FIG. 8 is a side view, partially in cross-section, of the bar-pin journal and elastomeric socket shown in FIG. 7;

FIG. 9 is a cross-sectional side view of the elastomeric socket shown in FIG. 7 and 8;

FIG. 10 is a plan view, partially in cross-section illustrating a unique V-configuration torque rod in accordance with another embodiment of the present invention; and FIG. 11 is an enlarged view, partially in cross-section of the apex pivotal joint of the torque rod shown in FIG. 10.

DETAILED DESCRIPTION OF THE PREFERRED EMBODIMENT

Figure 1:
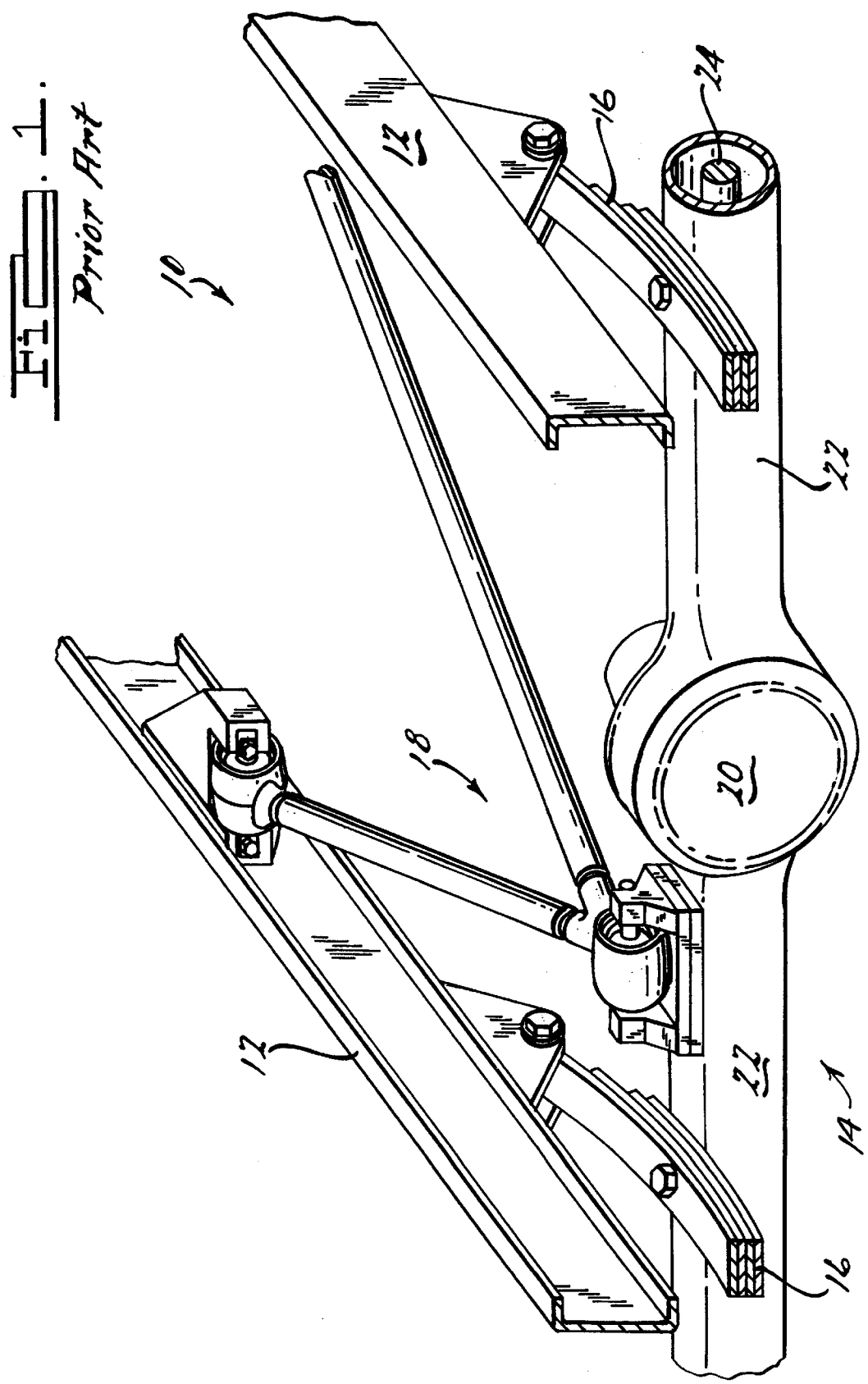
FIG. 1 is a partial perspective view of a typical truck or bus rear suspension having a prior art V-configuration torque rod.

Referring now to the drawings in which like reference numerals designate like or corresponding parts throughout the several views, there is shown in FIG. 1 a prior art truck or bus rear suspension indicated generally by the reference numeral 10. Rear suspension 10 comprises a frame 12, a drive axle 14, a pair of springs 16 and a V-configuration torque rod 18. Frame 12 supports a body (not shown) and other components of the vehicle which are termed the sprung mass. Drive axle 14 includes a differential 20 which receives torque from an engine (not shown) through a prop shaft (not shown). Drive axle 14 also includes a pair of hollow tubes 22 that each extend out to a respective wheel assembly (not shown). Disposed within each tube 22 is a drive shaft 24 that extends to a hub (not shown) to which is attached to a wheel (not shown). The engine transmits torque to differential 20 though the prop shaft. Differential 20 transfers the torque from the prop shaft to drive shafts 24 to rotate and thus drive the wheels. Springs 16 are disposed between frame 12 and drive axle 14 as is well known in the art. Additionally, a shock absorber (not shown) can be disposed between frame 12 and drive axle 14 to damper the motion between these two components. Torque rod 18 is also disposed between frame 12 and drive axle 14 to control the motion of drive axle 14 with respect to frame 12.

Figure 2:
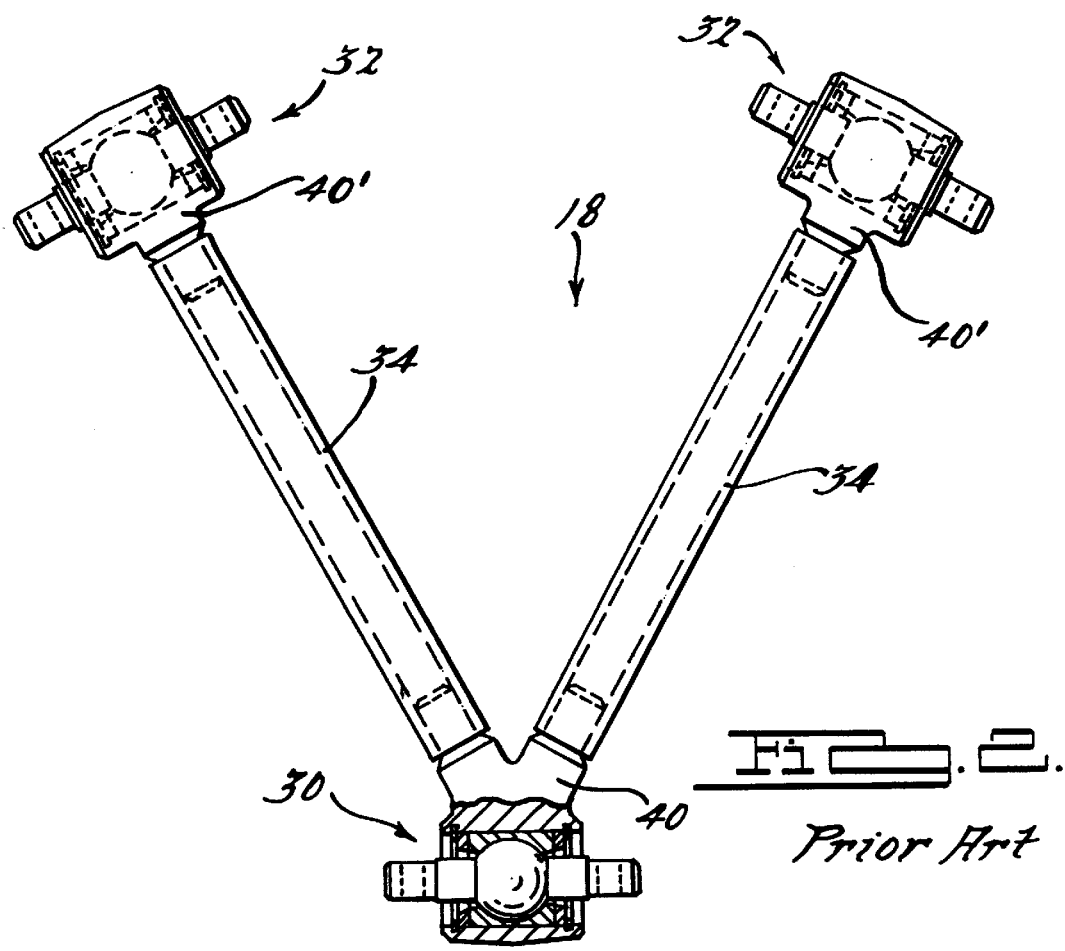
FIG. 2 is a plan view, partially in cross-section, illustrating the prior art V-configuration torque rod shown in FIG. 1.

Referring now to FIG. 2, V-configuration torque rod 18 comprises an apex pivotal joint assembly 30, a pair of end pivotal joint assemblies 32 and a pair of tubes 34. Each tube 34 extends between apex pivotal joint assembly 30 and a respective end pivotal joint assembly 32. Apex pivotal joint assembly 30 and end pivotal joint assemblies 32 are secured to tubes 34 by welding or by other means known well in the art.

Figure 3:
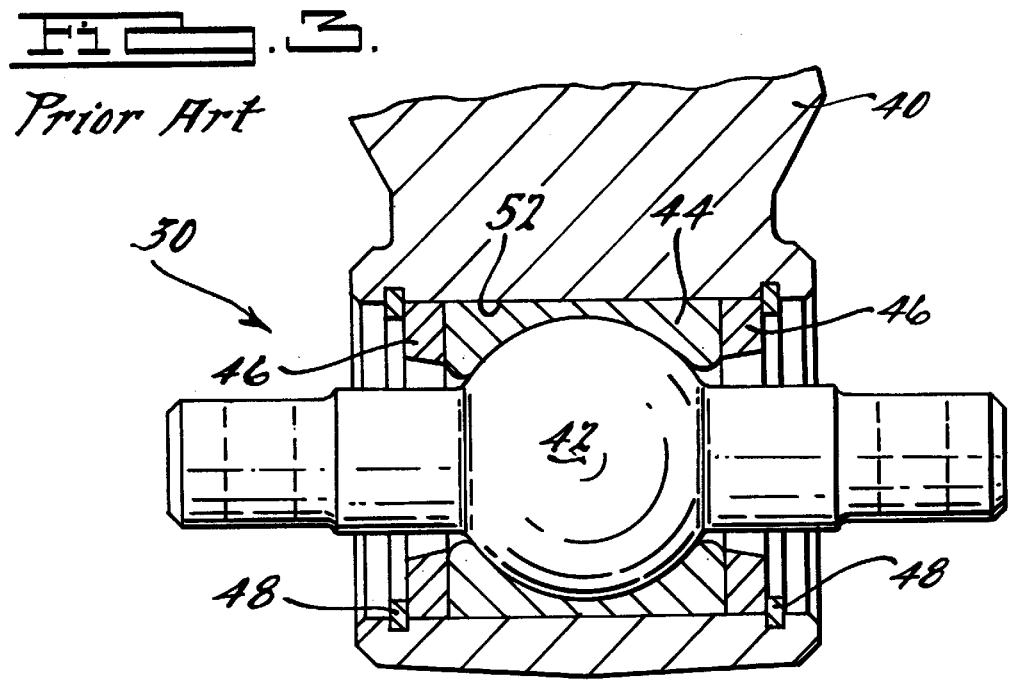
FIG. 3 is an enlarged plan view, partially in cross-section, of the apex pivotal joint of the torque rod shown in FIGS. 1 and 2.

Referring now to FIG. 3, apex pivotal joint assembly 30 comprises a forged eyelet 40, a bar-pin journal 42, a bearing socket 44, a pair of thrust washers 46 and a pair of snap rings 48. The construction of end pivotal joint assemblies 32 are the same as apex pivotal joint assembly 30 except that forged eyelet 40 is replaced with forged eyelet 40' (FIG. 2). Bar-pin journal 42 is inserted into the central bore of bearing socket 44 and this assembly is inserted into a bore 52 extending through eyelet 40. The inherent elasticity of bearing socket 44 permits the assembly of bar-pin journal 42 into bearing socket 44. The insertion of journal 42 and socket 44 into bore 52 compresses socket 44 for a pre-specified percent compression. One thrust washer 46 is inserted on each side of socket 44 and the assembly is maintained by inserting one snap ring 48 into a groove 54 located on each end of bore 52. Bearing socket 44 provides the isolation for assembly 30 during the movement of drive axle 14 with respect to frame 12. Thrust washers 46 limit the lateral movement of journal 40 and socket 44 during this movement. In order to provide the necessary conical movement of bar-pin journal 42, both bearing socket 44 and thrust washers 46 have an appropriately sized center aperture. This ensures that gyrations of drive axle 14 in all directions will be accommodated.

Referring now to FIG. 4, a truck or bus rear suspension is illustrated incorporating the unique pivotal joint constructing in accordance with the present invention and it is designated generally by the reference numeral 110. Rear suspension 110 comprises frame 12, drive axle 14, the pair of springs 16 and a V-configuration torque rod 118. Rear suspension 110 is thus the same as rear suspension 10 but it replaces torque rod 18 with torque rod 118.

Referring now to FIG. 5, V-configuration torque rod 118 comprises an apex pivotal joint assembly 130, a pair of end pivotal joint assemblies 132 and the pair of tubes 34. Each tube 34 extends between apex pivotal joint assembly 130 and a respective end pivotal joint assembly 132. Apex pivotal joint assembly 130 and end pivotal joint assemblies 132 are secured to tubes 34 by welding or by other means known in the art.

Referring now to FIGS. 6 and 7, apex pivotal joint assembly 130 comprises a pair of forged eyelets 140, a bar-pin journal 142, a bearing socket 144, a pair of thrust washers 146, a pair of snap rings 148 and an intermediate sleeve 150. The construction of end pivotal joint assemblies 132 are the same as apex pivotal joint assembly 130 except that forged eyelet 140 is replaced with a forged eyelet 140'. Bar-pin journal 142 is inserted into the central bore of bearing socket 144 and this assembly is inserted into a bore 152 extending through intermediate sleeve 150. The inherent elasticity of bearing socket 144 permits the assembly of bar-pin journal 142 into bearing socket 144. Preferably, bearing socket 144 is made from an elastomeric composition such as urethane or natural rubber compounds having suitable physical properties (i.e., low friction, abrasion resistance, elasticity, etc.). The insertion of journal 142 and socket 144 into bore 152 compresses socket 144 for a pre-specified percent compression. One thrust washer 146 is inserted on each side of socket 144 and the assembly is maintained by inserting one snap ring 148 into a groove 154 located on each end of bore 152. This entire assembly thus comprises a cartridge assembly which includes all of the joint assembly components except the eyelets. This cartridge assembly allows for the simplified manufacture and assembly of the cartridge assembly regardless of whether the cartridge assembly is used as an apex joint or if it is used as an end joint. The cartridge assembly is inserted into a bore 156 extending through both forged eyelets 140 when assembly 130 is being manufactured and into a bore 156' extending through forged eyelets 140' when assembly 132 is being manufactured. Intermediate sleeve 150 is sized to be press fit with bore 156 and 156' in order to achieve a solid joint between sleeve 150 and the pair of forged eyelets 140 and forged eyelets 140', respectively. A shoulder 162 is formed on sleeve 150 to position sleeve 150 within bore 156 and 156' of eyelets 140 and 140', respectively. A snap ring 164 is inserted into a groove 166 on the opposite side of eyelets 140 and 140' to secure sleeve 150 within bore 156 and bore 156', respectively. Bearing socket 144 provides the isolation for assembly 130 during the movement of drive axle 14 with respect to frame 12. Thrust washers 146 limit the lateral movement of journal 142 and socket 144 during this movement. In order to provide the necessary conical movement of bar-pin journal 142, both bearing socket 144 and thrust washers 146 have an appropriately sized center aperture. This ensures that gyrations of drive axle 14 in all directions will be accommodated.

Referring now to FIGS. 7–9, bar-pin 142 includes a semi-spherical ball or sliding surface 170 and a non-metallic, low friction (i.e., plastic) bearing material coating 172. Coating 172 is applied by an economical semi-precision production injection molding process. This process provides close tolerances and smooth surface finish control. Both of these requirements are essential for a high quality, high performance pivotal joint while eliminating costly machining or secondary finishing operations. Coating 172 is mechanically and/or chemically secured to surface 170, thus preventing any relative movement between surface 170 and coating 172. The mechanical link between coating 172 and surface 170 can be obtained by forming grooves in surface 170 into which coating 172 is molded or by other means known well in the art. Consequently, the sliding motion is limited to and takes place only between the outer surface of coating 172 and an inside surface 174 on bearing socket 144. In order to maintain control over the positioning of the sliding motion, the outer surface of bearing socket 144 is mechanically and/or chemically bonded to bore 152 of intermediate sleeve 150. In order to provide lubricant between coating 172 and surface 174, surface 174 of bearing socket 144 defines a plurality of lubricant pockets or reservoirs 176. Reservoirs 176 are filled with a suitable lubricant prior to the assembly of bar-pin journal 142 with bearing socket 144. In order to retain this lubricant and protect the sliding surfaces, bearing socket 144 incorporates an integrally molded internal seal ring 178 located on each end of socket 144. Seal rings 178 extend beyond interior surface 174 (FIG. 9). When journal 142 is snapped into socket 144, the ends of socket 144 will expand slightly as shown at 180 in FIG. 8. When this assembly is inserted into bore 152 of sleeve 150, seal rings 178 will be compressed producing a mating surface to the exterior surface of coating 172 resulting in an internal annular compression seal ring.

Referring now to FIGS. 10 and 11, a V-shaped torque rod 218 in accordance with another embodiment of the present invention is illustrated. V-configuration torque rod 218 comprises an apex pivotal joint assembly 230, the pair of end pivotal joint assemblies 132 and the pair of tubes 34. Each tube 34 extends between apex pivotal joint assembly 230 and a respective end pivotal joint assembly 132. Apex pivotal joint assembly 230 and end pivotal joint assemblies 132 are secured to tubes 34 by welding or by other means known in the art.

Referring now to FIG. 11, apex pivotal joint assembly 230 comprises a forged eyelet 240, bar-pin journal 142, bearing socket 14, the pair of thrust washers 146, the pair of snap rings 148 and intermediate sleeve 150. Thus, pivotal joint assembly 230 is the same as pivotal joint assembly 150 except that the pair of forged eyelets 140 have been replaced with the single piece forged eyelet 240. Eyelet 240 defines bore 156 which receives intermediate sleeve 150 as well as the other components of the joint assembly. The operation and function of joint assembly 230 is the same as joint assembly 136.

While the above detailed description describes the preferred embodiment of the present invention, it should be understood that the present invention is susceptible to modification, variation and alteration without deviating from the scope and fair meaning of the subjoined claims.

What is claimed is:

1. A pivotal joint assembly comprising:
    an eyelet member defining a bore;
    an intermediate sleeve extending through said bore, said intermediate sleeve defining an aperture;
    an elastomeric bearing socket disposed within said aperture, said elastomeric bearing socket defining a pocket;
    a thrust washer disposed adjacent said elastomeric bearing socket;
    a snap ring disposed within a groove formed in said intermediate sleeve adjacent said thrust washer; and
    a bar-pin journal slidingly disposed within said pocket of said elastomeric bearing socket.

2. The pivotal joint assembly according to claim 1 wherein, said intermediate sleeve defines a shoulder for engagement with said eyelet member.

3. The pivotal joint assembly according to claim 2 wherein, said intermediate sleeve defines a groove located at an end opposite to said shoulder and said pivotal joint assembly further comprises a snap ring disposed within said groove.

4. The pivotal joint assembly according to claim 1 wherein, said intermediate sleeve is secured to said eyelet member by a press fit.

5. The pivotal joint assembly according to claim 1 wherein, said pocket defines a first partially spherical surface and said bar-pin journal defines a second partially spherical surface in sliding contact with said first partially spherical surface.

6. The pivotal joint assembly according to claim 5 wherein, one of said first and second partially spherical surfaces define a plurality of lubrication reservoirs.

7. The pivotal joint assembly according to claim 5 wherein, said first partially spherical surface defines an integral seal ring mating with said second partially spherical surface.

8. The pivotal joint assembly according to claim 5 wherein, said bar-pin journal comprises a plastic coating which defines said second partially spherical surface.

9. The pivotal joint assembly according to claim 1 wherein, said bar-pin journal comprises a plastic coating slidingly engaging said pocket.

10. A pivotal joint assembly comprising:
    an eyelet member defining a bore, said eyelet member comprising a first and a second eyelet, said second eyelet being disposed adjacent said first eyelet, said first and second eyelets defining said bore;
    an intermediate sleeve extending through said bore, said intermediate sleeve defining an aperture;
    an elastomeric bearing socket disposed within said aperture, said elastomeric bearing socket defining a pocket; and a bar-pin journal slidingly disposed within said pocket of said elastomeric bearing socket.

11. The pivotal joint assembly according to claim 10 wherein, said intermediate sleeve defines a shoulder for engagement with said first eyelet.

12. The pivotal joint assembly according to claim 11 wherein, said intermediate sleeve defines a groove located at an end opposite to said shoulder and said pivotal joint assembly further comprises a snap ring disposed within said groove.

13. The pivotal joint assembly according to claim 10 wherein, said intermediate sleeve is secured to said first and second eyelets by a press fit.

14. The pivotal joint assembly according to claim 10 wherein, said pocket defines a first partially spherical surface and said bar-pin journal defines a second partially spherical surface in sliding contact with said first partially spherical surface.

15. The pivotal joint assembly according to claim 14 wherein, one of said first and second partially spherical surfaces define a plurality of lubrication reservoirs.

16. The pivotal joint assembly according to claim 14 wherein, said first partially spherical surface defines an integral seal ring mating with said second partially spherical surface.

17. The pivotal joint assembly according to claim 14 wherein, said bar-pin journal comprises a plastic coating which defines said second partially spherical surface.

18. The pivotal joint assembly according to claim 10 further comprising a thrust washer disposed adjacent said elastomeric bearing socket.

19. The pivotal joint assembly according to claim 18 further comprising a snap ring disposed within a groove formed in said intermediate sleeve adjacent said thrust washer.

20. The pivotal joint assembly according to claim 10 wherein, said bar-pin journal comprises a plastic coating slidingly engaging said pocket.

21. A torque rod comprising:
a first end joint assembly;
a first elongated member secured to said first end joint assembly;
a second end joint assembly;
a second elongated member secured to said second end joint assembly;
an apex pivotal joint assembly secured to said first and second elongated members, said apex pivotal joint assembly comprising:
a first eyelet defining a first bore;
a second eyelet defining a second bore;
an intermediate sleeve extending through said first and second bores, said intermediate sleeve defining an aperture;
an elastomeric bearing socket disposed within said aperture, said elastomeric bearing socket defining a pocket; and
a bar-pin journal slidingly disposed within said pocket of said elastomeric bearing socket.

22. The torque rod according to claim 21 wherein, said intermediate sleeve defines a shoulder for engagement with said first eyelet.

23. The torque rod according to claim 22 wherein, said intermediate sleeve defines a groove located at an end opposite to said shoulder and said pivotal joint assembly further comprises a snap ring disposed within said groove.

24. The torque rod according to claim 21 wherein, said intermediate sleeve is secured to said first and second eyelets by a press fit.

25. The torque rod according to claim 21 wherein, said pocket defines a first partially spherical surface and said bar-pin journal defines a second partially spherical surface in sliding contact with said first partially spherical surface.

26. The torque rod according to claim 25 wherein, one of said first and second partially spherical surfaces define a plurality of lubrication reservoirs.

27. The torque rod according to claim 25 wherein, said first partially spherical surface defines an integral seal ring mating with said second partially spherical surface.

28. The torque rod according to claim 25 wherein, said bar-pin journal comprises a plastic coating which defines said second partially spherical surface.

29. The torque rod according to claim 21 further comprising a thrust washer disposed adjacent said elastomeric bearing socket.

30. The torque rod according to claim 29 further comprising a snap ring disposed within a groove formed in said intermediate sleeve adjacent said thrust washer.

31. The torque rod according to claim 21 wherein, said bar-pin journal comprises a plastic coating slidingly engaging said pocket.

* * * * *